INVENTOR.
ROBERT C. A. ELAND
BY
OSTROLENK, FABER, GERB & SOFFEN
ATTORNEYS

INVENTOR.
ROBERT C. A. ELAND
BY
OSTROLENK, FABER, GERB & SOFFEN
ATTORNEYS 3,066,270
Patented Nov. 27, 1962

3,066,270

TURRET TUNER WITH FLAT SPIRAL COILS

Robert C. A. Eland, Arcadia, Calif., assignor to Standard Coil Products Co. Inc., Melrose Park, Ill., a corporation of Illinois Filed Jan. 22, 1960, Ser. No. 4,105
4 Claims. (Cl. 334—50)

This invention relates generally to television tuners, and more particularly relates to novel circuit arrangements and means for effecting efficient antenna coupling action to the input of the R.F. amplifier stage thereof.

A VHF television tuner is selectable over the several broadcast stations or channels, each of 6 megacycle bandwidth. Such tuners may incorporate discs, a turret, or the like wherein each selected tuning position connects individual coils or inductances to the stationary tuner circuit. Such tuner, of the turret-type is described in my copending patent application Serial No. 600,496 filed July 27, 1956, for "Neutralizing Circuits," now Patent No. 2,949,580.

In the interest of economy, the antenna input network is generally coupled to the grid input of the RF amplifier stage through a series coil. A number of series coils, providing inductances individual for the twelve channel frequency bands, is used for the selective tuning. As shown in the referred to patent application, each panel of the turret tuner has one antenna coil of the proper size, with two contact pins to connect it in the RF input circuit when in the selected position.

However, a more efficient input circuit for television tuners uses inductively coupled windings, in-effect forming a transformer for each channel position. Such transformer action, suitably matched and proportioned for each channel frequency band, required twenty-four coils for the twelve channels, each requiring four contact pins (instead of two) on the panels. In this manner optimum energy and impedance transfer was obtained individually in each tuning position. Thus each channel position was provided with excellent selectivity response and energy transfer in the RF input or antenna circuit of the tuner, at the cost of an extra coil and two contact pins.

In accordance with the present invention I provide the advantages of such individual channel transformer coupling using only one primary winding. The individual secondary coils are arranged in a novel manner to be effectively coupled with the primary winding when positioned or selected for tuning. Thus, in a turret-type tuner, each panel has its antenna coil mounted on the panel surface adjacent the fixed circuit section of the tuner. The primary winding is supported opposite such surface portions, in the fixed tuner circuit section. The coils are arranged to become closely coupled at each channel position.

An important feature of the present invention is the utilization of flat coils for both the primary and secondary windings. The fixed primary winding and the movable secondary windings are preferably made in "pancake" or spiral form. I have found that such coil shape is particularly effective in energy transfer from primary to secondary windings, acting in a manner of a narrow directional beam from the primary to the selected secondary coil. In practical turret tuners, these coils can be made to be of the order of 0.060 and less apart, when in tuning position. The result is excellent efficient mutual intercoupling across the flat air core coils throughout the whole VHF range of frequencies, namely 54 to 216 mc.

The advantageous full transformer action in antenna network to RF amplifier input is accomplished with the present invention in an economical manner. Only twelve individual antenna circuit coils are used, one in each tuning position or panel, together with the twelve contact pins therefor; and the addition only of one primary winding and two wiper contactors. Such small additional cost over the "series" coil system provides the advantages stated herein.

It is accordingly an object of the present invention to provide a novel antenna input coupling circuit arrangement for television tuners.

Another object of the present invention is to provide a novel transformer coupling system for television tuners that is selective and efficient for all channels.

A further object of the present invention is to provide a novel antenna coil coupling system for television tuners utilizing a single flat or spiral primary winding and individual coacting flat secondary windings.

Still another object of the present invention is to provide a novel flat coil coupling transformer system of economical construction for turret television tuners.

These and further objects of the present invention will become more apparent from the following description of an exemplary embodiment thereof, taken in conjunction with the drawings in which.

Figure 1:
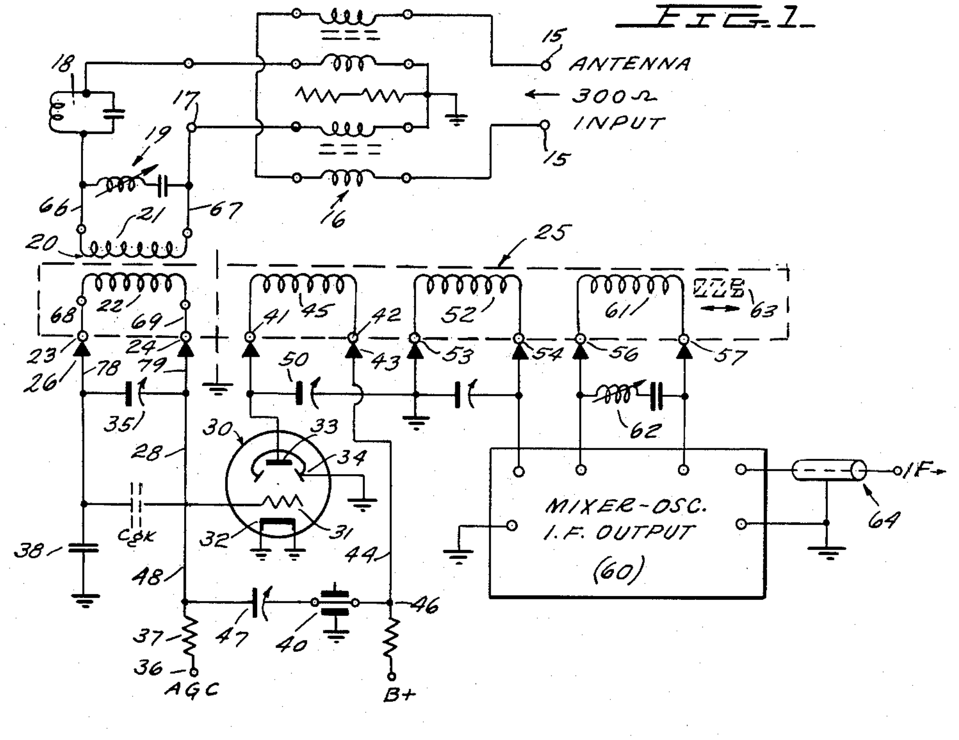
FIGURE 1 is a schematic diagram of a VHF turret-type tuner circuit, incorporating the invention antenna coupling transformer.

The VHF twelve channel tuner in which one form of the invention coupling transformer is incorporated is electrically diagrammed in FIGURE 1. The 300 ohm antenna twin lead-in is connected to the terminals 15, 15. A balun-type transformer 16 connects to antenna terminals 15, 15. The output terminals 17, 17 of unit 16 connects to the primary winding 21 of the RF input transformer 20 through conventional high-pass traps 18 and 19. The transformer 16, traps 18, 19 and primary winding 21 are all stationary fixed to the tuner chassis, and common circuitwise for all selected VHF channels, as will be set forth in detail hereinafter.

An individual secondary winding 22 for RF input transformer 20 is mounted on each of the panels 25 of the turret tuner for selective coaction with the single fixed primary winding 21. The configuration and arrangement of windings 21, 22 is to obtain optimum coupling *c* therebetween for each channel position of the turret. A preferred embodiment thereof is illustrated and described hereinafter in connection with FIGURES 2 to 6. These are as coils that are flat and spiral wound. It is noted that the individual secondary coils 22 connect into the tuner circuit through only two panel contacts 23, 24; whereas the fixed primary winding 21 requires no movable contacts or wipers.

The selected secondary winding 22 connects directly to the input of the RF amplifier stage 30; with contact 23 conducted to ground through wiper blade 26, and contact 24 to the input grid electrode 31 through wiper blade 27 and lead 28. The RF amplifier 30 input circuit capacitance $C_{gk}$ to ground, inherent between grid electrode 31 and cathode 32, is part of the tuned secondary 22 circuit, as indicated in FIGURE 1. A trimmer condenser 35 is optionally connected across $C_{gk}$ and fixed wiper blades 26, 27 in order to adjust the circuit to optimum condition, particularly after RF tube 30 change.

The inductance of the individual coils 22 are proportioned in the RF input circuit to which they are selectively connected to tune to the corresponding television channel frequency band for their respective panels in the manner known in the art. The grid electrode 31 has automatic gain control, A.G.C. applied at terminal 36 through resistor 37. A blocking condenser, as 38 keeps the A.G.C. bias from shorting to ground.

The RF amplifier stage 30 may be of any desired type suitable for the VHF band, namely from channel 2, 54 mc.; through channel 13, 216 mc. Thus a cascode amplifier, tetrode, pentode or neutralized triode stage may be employed at stage 30, with my invention RF coupling transformer system serving equally well. The circuit of stage 30 illustrated in FIGURE 1 is that of a wide-band neutralized triode stage as fully described in my copending application Serial No. 600,496, filed July 27, 1956, Patent No. 2,949,580, for "Neutralizing Circuits."

As described in detail in the referred to application, the neutralized triode stage 30, referred to commercially as the "Neutrode" for VHF tuners manufactured and sold by the assignee company, employs a "guided grid" type tube. Such tube 30 contains an auxiliary shield 34 between the grid electrode 31 and portions of the anode 33 to materially reduce the interelectrode capacitance therebetween. They are the currently established receiving tube types 6ER5, 6ES5 and 6FH5, based on my patent application Serial No. 750,956, filed July 25, 1958, for "High Efficiency Triode Vacuum Tube," now Patent No. 2,968,742 and assigned to the assignee hereof. Further, the tube 30 has a higher dynamic plate resistance and thereby provides enhanced amplication as compared to regular triodes in that it permits a higher tuned output circuit as set forth in the latter applications.

The wide band neutralization, over the whole VHF television band of 54 mc. to 216 mc. is accomplished by the neutralizing method referred to, utilizing a feed-through condenser the body of which is grounded to the chassis. The feed-through condenser 40 connects the low side 42 of RF output coil 45, through wiper 43 and B+ lead 44 at junction 46 to the neutralizing adjustable condenser 47; and in turn, through lead 48, to the grid electrode 31. The plate electrode 33 connects to the output coil 45 through contact pin 41. For optimum neutralization action over the VHF band this relationship is approached: The capacitance of feed-through 40 to ground is to the capacitance of the plate electrode 33 and its associated output circuitry 45, 42, 43, 50, etc., to signal ground; as the adjusted capacitance of the neutralizing condenser 47 is to the grid 31 to plate 33 capacitance of the triode 30.

The RF output circuit from plate 33 comprises the coil 45 in panel 25 and a conventional trimmer condenser 50. A shield 51 is provided in the tuner to isolate coils 22 and 45 of each panel. The interstage secondary winding, coil 52 is mutually coupled with coil 45 and connects through suitable panel contacts 53, 54 to trimmer condenser 55. The coils 45 and 52 are proportioned to tune to the particular TV channel represented by its panel 25, in the usual manner. The secondary coil 52 connects to the grid electrode of a conventional mixer stage included in circuit section 60.

A local oscillator is contained in unit 60, coactable with the selected panel oscillator coil 61 through panel pins 56, 57. Suitable mixer-oscillator circuits are described in the first two referred to applications hereinabove. A fine tuning shunt coil 62 connects across the selected oscillator coil 61, adjustable through external control to accurately tune to the oscillator frequency for each panel, and channel. A slug 63 at each oscillator coil 61 is used to pre-set the frequency of each panel in the conventional way. The IF output signal at the predetermined intermediate frequency of the receiver (not shown) is indicated a coaxial output cable 64.

Figure 2:
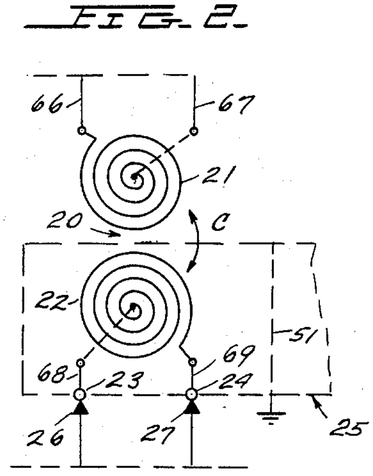
FIGURE 2 is a diagrammatic representation of the exemplary antenna coupling transformer system for a turret tuner.

FIGURE 2 is a diagrammatic representation of the spiral flat RF coupling coils 21, 22 corresponding to those indicated schematically in FIGURE 1, and shown in practical embodiment in FIGURES 3 to 6. The primary coil 21 is fixed and physically close to the secondary coil 22 of the selected panel providing a tight or close magnetic coupling therebetween. Primary spiral coil 21 is connected C to the fixed tuner antenna input circuitry 65 (see FIGURE 1) through leads 66, 67; and secondary spiral coil 22 to respective panel contacts 23, 24 through leads 68, 69.

Figure 3:
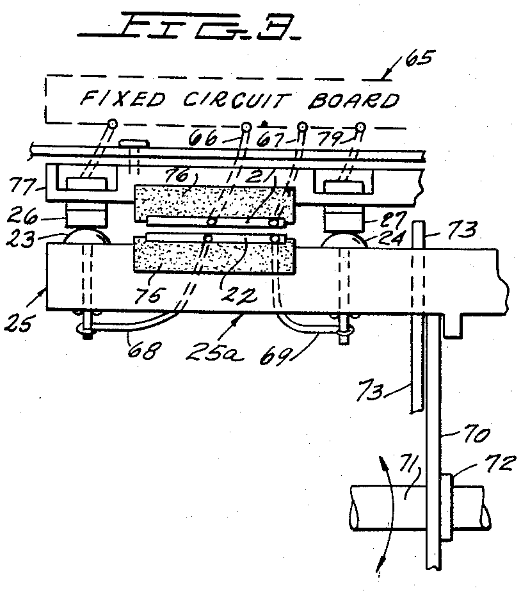
FIGURE 3 is an end view of a VHF turret tuner showing the physical arrangement of the antenna coupling in accordance with my invention.

As seen in FIGURE 3, the panels 25 are individually mounted, firmly, in a turret array at the periphery of discs, with one shown at 70 secured to selector straps 71 across its hub 72 as by spot welding. Details of the plural panel 25 mounting and their selective circuital action in a turret tuner is set forth in the aforesaid patent application Serial No. 600,496. A spring finger 73 extends from disc 70 through an aperture in each panel 25 to secure it against radial displacement; the discs holding them against longitudinal shifting. At the extending portion 25*a*, where the series antenna coil was mounted in the prior turret tuners is incorporated the flat secondary coil 22.

Secondary coil 22 is inserted at the top of the panel section 25*a*. The contact pins 23, 24 straddle the mounted coil 22. Coil 22 being flat is arranged parallel to the outer face of the panel 25, and raised for close coaction with the primary coil 21 affixed to the chassis section. Coil 22 is manufactured separately from the panel and may be made integral with a block 75 of low-loss dielectric material. In such event block 75 is suitably attached to a corresponding cavity in panel section 25*a*, as shown in FIGURE 3. Correspondingly, coil 21 made integral with a composition block 76 is suitably secured in position in a cavity in the wiper blade mounting board.

The wiper board 77 contains predetermined regions to operatively carry the individual wiper blades or springs 26, 27, etc. for electrical coaction with the selected panel contacts 23, 24 etc. The RF antenna circuit wipers 26, 27, etc. for electrical coaction with the selected panel contacts 23, 24 etc. The RF antenna circuit wipers 26, 27 connect to the input circuit 35, $C_{gk}$ and grid 31 through respective leads 78, 79. While the RF transformer coils 21, 22 are shown mounted between contacts 23, 24 and between wiper blades 26, 27, it is to be understood that their relative location along section 25*a* is optional. The important factor is their mounting for close electromagnetic coaction, with their outer surfaces arranged to clear for normal manufacturing tolerances, yet be as close together as practicable upon channel selection.

The specific use of flat or "pancake" coils for coils 21, 22 makes the factor of the coil spacing when opposed not critical. This spacing may be as large as .060" between coils 21, 22, and still provide excellent results. This is because I have found that with the pancake coils adequate coupling between the coils 21, 22 for excellent electrical results can be readily obtained in actual practice affording efficient transformer coupling at less cost than in prior tuner systems. Heretofore it has been necessary to use powdered iron or ferrite cores and/or to interlace the primary and secondary windings to obtain usable coupling action. The invention coupling system therefore is simple, direct, effective, and readily usable in turret tuners as described herein.

The flat spiral or pancake transformer coils 21, 22 appear to have very narrow directional electromagnetic effects, one to the other. The primary coil 21, when energized by a television channel signal, apparently "squirts" the RF energy in a very narrow directional beam into the secondary coil 22, when held opposed as shown in FIGURE 3. This effective interaction or coupling *c* is produced with no magnetic core, as ferrite or powdered iron, making for a cheaper construction. The secondary pancake coils 22 can be made of resistance wire to obtain good matching with high A.G.C. bias on the RF amplifier tube 30.

It is thus now apparent that a full transformer action from antenna circuit to RF tube input is accomplished by my invention with only twelve basic antenna coils 22 (one for each panel), and only one additional coil, the single primary winding 21. Further, only twenty four contact pins, corresponding to antenna section pins 23, 24 are used; no more than in the simple prior series coil circuits. The advantages of the transformer 20 with coupling coils 21, 22 has good energy transfer from antenna circuit to the RF tube 30 input, at the frequency to which the selected secondary coil 22 is tuned; and also has excellent band-pass curve "skirt" selectivity. As a result undesired signals are rejected on either side of such individual channel tuned band-pass.

Figure 4:
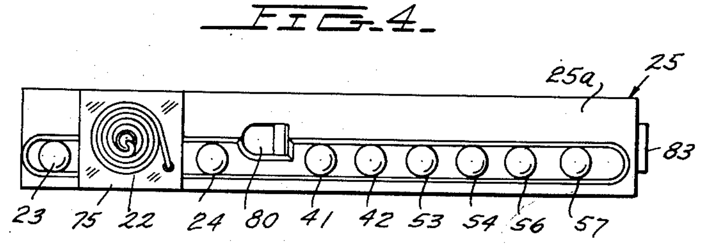
FIGURES 4 and 5 are respective top and bottom views of an exemplary circuit panel for a particular VHF channel as used in the tuner of FIGURE 3.
Figure 5:
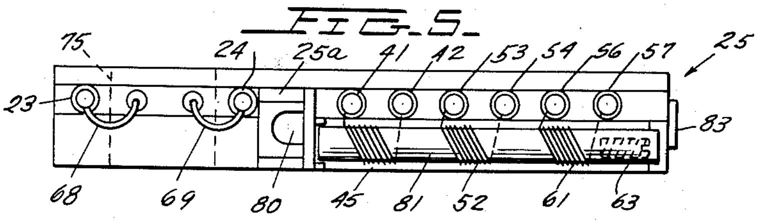

FIGURES 4 and 5 illustrate panel 25 with pancake coil 22 set in insert 75 into the panel section **25*a* extending from the locking finger aperture 80. The insert 75 is fitted between contact pins 23, 24; and does not extend beyond the longitudinal edges of panel 25. The interstage coils 45, 52 and oscillator coil 61 are wound on a single coil form 81, in the conventional manner. Slug 63 is retained in the end of form 81, for axial adjustment. The projecting lug 83** is for locking each panel end in the turret end disc (not shown). Reference is made to the aforesaid applications for further details of the turret and tuner construction.

Figure 6:
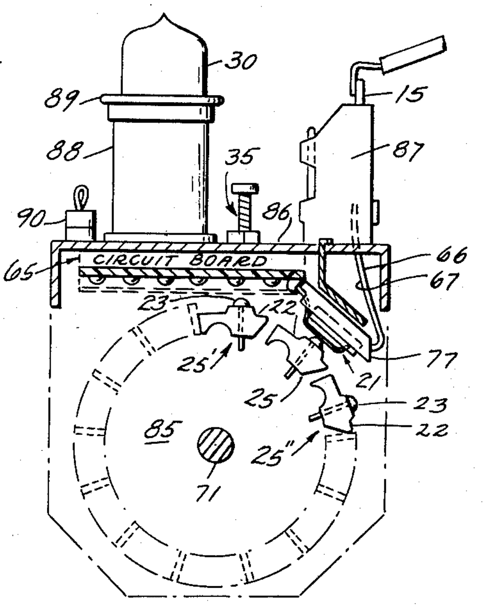
FIGURE 6 is an end view, partially in section of the tuner of FIGURE 3.

FIGURE 6 is an end view, partially in schematic and in partial section. The plurality of panels 25 are arranged in a cylindrical turret or drum 85 operable by central selector strap 71 and positioned by detent mechanism (not shown). The selected panel 25 coacts with the blades on wiper board 77, as well as between its coil 22 and the fixed primary coil 21, in the manner hereinabove set forth. The adjacent panels 25', 25' are likewise positionable for individual circuital action with the blade board 77 and the circuit board 65 electrically interconnected therewith. All the twelve channels are thus selectively tuned-in by the drum 85.

The antenna transformer and traps (see FIGURE 1) are supported above the chassis body 86 in a bracket 87, with the antenna lead-in terminals 15, 15 projecting above. The RF amplifier tube 30 has a tube shield 88 with a slidable section 89. The trimmer condenser 35 for the RF input circuit is seen above the chassis 86; and a number of feed-through terminals 90 are to connect from externally to the tuner circuit board below in the conventional manner.

Although I have described my invention in an exemplary form, it is to be understood that modifications may be made therein that fall within the broader spirit and scope of the invention as set forth in the following claims.

I claim:

1. In a television tuner with a stationary section containing an antenna input network and an RF amplifier stage, and a rotatable turret tuning assembly selectively coactable with the stationary section for individual television channel reception; a primary winding in circuit connection with the antenna input network and fixedly supported in said stationary section, a plurality of secondary windings fixedly mounted about said rotatable tuning assembly for individual coupling with said primary winding upon selective operation of the assembly, individual contacts for said secondary windings in the assembly, contacting means extending from the stationary section for electrical connection with the contacts of a selected secondary winding, circuit means establishing an input circuit for the RF amplifier stage including the selected secondary winding and tuned to the associated channel frequency band with substantial selectivity, each secondary winding being a part of an individual circuit panel mounted in the assembly to establish the tuner circuit for reception of the selected television channels, said stationary primary and the rotatable secondary windings being in substantially flat form oriented for substantially close effective mutual coupling between the primary winding and the secondary winding in the selected panel to effect transformer action between the primary and selected secondary windings for efficient circuit action between the input of the RF amplifier stage and the antenna network directly upon the selective displacements of said assembly.

2. A television tuner as claimed in claim 1, in which the primary winding is a substantially spiral coil extending from the stationary section in a plane substantially parallel to the outer panel surfaces of the rotatable assembly that are adjacent said primary winding.

3. A television tuner as claimed in claim 2, in which, said secondary windings are each flat spiral coils each oriented in a plane parallel to its respective panel outer surface, whereby the selected secondary coil is positioned parallel and in close coupling relation to the fixed primary coil.

4. A television tuner as claimed in claim 3, in which said primary coil is mounted in a plane substantially across the outer edge of said contacting means when in engaged relation, and each of said secondary coils is mounted on its associated panel in a plane substantially across the tips of its said contacts whereby the primary coil and the connected secondary coil are in close juxtaposition in each channel reception position.

References Cited in the file of this patent

UNITED STATES PATENTS

| | | |
|---|---|---|
| 1,891,092 | Hinsky | Dec. 13, 1932 |
| 2,468,126 | Silver | Apr. 26, 1949 |
| 2,535,686 | Lawrence | Dec. 26, 1950 |
| 2,583,854 | Kehbel | Jan. 29, 1952 |
| 2,646,513 | Marco | July 21, 1953 |
| 2,657,365 | Lazzery | Oct. 27, 1953 |